United States Patent
Vos et al.

(10) Patent No.: US 10,051,570 B2
(45) Date of Patent: Aug. 14, 2018

(54) METHOD AND APPARATUS FOR COMMUNICATION OF SYSTEM INFORMATION IN A WIRELESS SYSTEM

(71) Applicant: Sierra Wireless, Inc., Richmond (CA)

(72) Inventors: Gustav Gerald Vos, Surrey (CA); Steven John Bennett, Coquitlam (CA)

(73) Assignee: Sierra Wireless, Inc., Richmond, British Columbia (CA)

(*) Notice: Subject to any disclaimer, the term of this patent is extended or adjusted under 35 U.S.C. 154(b) by 8 days.

(21) Appl. No.: 14/934,038

(22) Filed: Nov. 5, 2015

(65) Prior Publication Data

US 2016/0135124 A1    May 12, 2016

Related U.S. Application Data (60) Provisional application No. 62/076,383, filed on Nov. 6, 2014.

(51) Int. Cl.
*G08C 17/00* (2006.01)
*H04W 52/02* (2009.01)
*H04W 4/00* (2018.01)
*H04W 48/12* (2009.01)

(52) U.S. Cl.
CPC ....... *H04W 52/0216* (2013.01); *H04W 4/005* (2013.01); *H04W 48/12* (2013.01); *Y02B 60/50* (2013.01)

(58) Field of Classification Search
None
See application file for complete search history.

(56) References Cited

U.S. PATENT DOCUMENTS

2009/0221293 A1* 9/2009 Petrovic ............... H04W 48/10
                                                    455/450
2010/0067514 A1* 3/2010 Luo .......................... H04L 23/02
                                                    370/342

(Continued)

FOREIGN PATENT DOCUMENTS

WO    2015/066645 A1    5/2015
WO    2016/070285 A1    5/2016

OTHER PUBLICATIONS

PCT/CA2015/051149 International Search Report dated Feb. 3, 2016.

(Continued)

*Primary Examiner* — Rebecca E Song
(74) *Attorney, Agent, or Firm* — Wagenknecht IP Law Group PC (57) ABSTRACT

A method and apparatus for communicating system information in a wireless communication system is provided. The method comprises generating and sending by a base station, for example an eNB, a system information block (SIB) which includes at least one correlation enhancement bit. This SIB is received by the terminal, for example a MTC UE, and this SIB is subsequently correlated with a previously received SIB. Further, upon the correlation of the SIB and the previously received SIB, a determination is made whether the SIB has in fact changed. Upon determining if the SIB has changed, the terminal selects the correct SIB which is to be used for configuring communication with the base station.

26 Claims, 4 Drawing Sheets

(56) References Cited

U.S. PATENT DOCUMENTS

| | | | |
|---|---|---|---|
| 2012/0039256 A1* | 2/2012 | Kwon | H04W 48/12 370/328 |
| 2012/0263092 A1* | 10/2012 | Lee | H04W 72/005 370/312 |
| 2013/0115913 A1 | 5/2013 | Lin et al. | |
| 2015/0092674 A1* | 4/2015 | Das | H04W 72/0453 370/329 |
| 2016/0073326 A1* | 3/2016 | Vannithamby | H04W 48/12 370/312 |
| 2016/0212686 A1* | 7/2016 | Viorel | H04W 4/005 |

OTHER PUBLICATIONS

"LTE; Evolved Universal Terrestrial Radio Access (E-UTRA); Radio Resource Control (RRC); Protocol specification", 3GPP TS 36.331 version 12.3.0 Release 12, European Telecommunications Standard Institute Technical Specification ETSI TS 136 331 V12.3.0, Sep. 2014 [retreived from the internet] http://www.etsi.org/deliver/etsi_ts/136300_136399/136331/12.03.00_60/ts_136331v120300p.pdf.

\* cited by examiner

METHOD AND APPARATUS FOR COMMUNICATION OF SYSTEM INFORMATION IN A WIRELESS SYSTEM

CROSS REFERENCE TO RELATED APPLICATIONS

This application claims the benefit and priority of U.S. Provisional Application 62/076,383, filed Nov. 6, 2014. The foregoing application is incorporated by reference herein in its entirety.

FIELD OF THE INVENTION

The present technology pertains in general to wireless communications and in particular to communication of certain broadcast system information, such as system information blocks, in accordance with wireless standards such as LTE.

BACKGROUND

For User Equipment (UE) operating in a wireless communication system such as a Long Term Evolution (LTE) system, the UE is required to have the most up to date versions of the Master Information Block (MIB) and System Information Blocks (SIB) before the UE can transmit within the wireless system. For example, acquiring MIB and SIBs is typically done during initial power up of the UE, when changes in the cell being used for wireless communication occur, or when the MIB or SIB changes.

As is known, for a UE to access the evolved Node B (eNB) two different SIBs are required, namely SIB1 and SIB2. SIB 1 carries information relating to cell access related information, for example cell selection information and scheduling information. As is known, SIB 1 uses a fixed schedule for transmission by the eNB with a periodicity of 80 ms and repetitions made within 80 ms.

Currently, there is a focus on providing improved power consumption for a UE, in particular for machine-to-machine (M2M) wireless devices, or Machine Type Communication (MTC) devices, which may have significantly different operating requirements from typical user devices. For example, M2M devices such as wireless monitors or meters may only transmit relatively small amounts of data, possibly infrequently and possibly with high tolerance to latency, system acquisition times or the like.

For example, long sleep cycles for Power Saving Mode (PSM) are provided for in LTE release 12, wherein these long sleep cycles may exceed 2.5 seconds. Accordingly, a UE will potentially miss page notifications of changes to SIBs. As such, when a UE wakes up it is required to reconfirm that no MIB or SIB changes have occurred. Also as defined, SIB1 has a revision number for the UE to check thereby enabling a modified SIB1 to be identified.

Low power, low cost UE devices that are also able to work in low signal levels requiring coverage extension are desired. However, constraining these devices to receive the currently existing information messages (MIB and SIBs) requires these types of UE devices to receive more information than they need. Accordingly, unnecessary power is being used to receive and process these information messages that may not be necessary for their desired level of operation.

In light of the above power consumption concerns, proposals have been made for various scheduling and frequency restrictions to be placed on the existing system information transmissions. These types of restrictions are possible within the framework of the existing configurable scheduling options but may limit signalling information changes and signalling efficiency. Furthermore, with these types of restrictions, the timing of changes could affect the ability to communicate these changes to legacy devices served in a cell when they may be needed and also restrict the flexibility to efficiently schedule downlink communications by the eNB.

Therefore, there is a need for a method and apparatus for improving power consumption of a UE that is not subject to one or more limitations in the prior art.

This background information is provided for the purpose of making known information believed by the applicant to be of possible relevance to the present technology. No admission is necessarily intended, nor should be construed, that any of the preceding information constitutes prior art against the present technology.

SUMMARY

An object of the present technology is to provide a method and apparatus for communicating system information in a wireless communication system. In accordance with an aspect of the present technology, there is provided a method for communicating system information from a base station to a user equipment (UE) in a wireless network. The method includes generating and sending by the base station, a system information block (SIB) including at least one correlation enhancement bit; receiving, by the UE, the SIB; correlating, by the UE, the SIB with a previously received SIB; determining, by the UE, if the SIB has changed based on the correlation; and selecting, by the UE, a correct SIB for configuring communication with the base station based on the determination.

In accordance with another aspect of the present technology, there is provided a base station for communicating system information to a user equipment (UE) in a wireless network. The base station includes a generator configured to generate a system information block (SIB) including at least one correlation enhancement bit; and a transmitter configured to transmit the system SIB including at least one correlation enhancement bit to the UE.

In accordance with an aspect of the present technology, there is provided a wireless terminal for receiving system information from a base station in a wireless network, the wireless terminal comprising: a receiver configured to receive a system information block (SIB) including at least one correlation enhancement bit; a correlator configured to correlate the SIB with a previously received SIB; a determination module configured to determine if the SIB has changed based on the correlation and select a correct SIB for configuring communication with the base station based on the determination.

In accordance with another aspect of the present technology, there is provided a computer program product comprising a non-transitory computer readable medium storing computer executable statements and instructions thereon that, when executed by a computer, perform operations for implementing the method for communicating system information from a base station to a user equipment (UE) in a wireless network. The method includes the steps of receiving, by the UE, the System Information Block (SIB), the SIB including at least one correlation enhancement bit; correlating, by the UE, the SIB with a previously received SIB; determining, by the UE, if the SIB has changed based on the correlation; and selecting, by the UE, a correct SIB for configuring communication with the base station based on the determination.

BRIEF DESCRIPTION OF THE FIGURES

These and other features of the technology will become more apparent in the following detailed description in which reference is made to the appended drawings.

DETAILED DESCRIPTION

Definitions

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this technology belongs.

Various technical terms specified herein may be understood with reference to standards documents pertaining to the Long Term Evolution (LTE) wireless communication, or similar wireless communication standards such as UMTS. While these terms should be read in a manner that is consistent with at least the LTE standard, it is understood that the technology as described herein may be adapted for use with certain other existing or future wireless communication standards or protocols.

At the present time, in order to mitigate power consumption by for example limited capability or low cost Machine Type Communication devices, (LC MTC) devices, an option has been provided wherein a single, size-optimized SIB (SIB-M) which contains only the system information required to serve the MTC devices for example LC MTC devices, has been configured. The SIB-M contains the necessary information for the MTC devices, which would typically be spread over plural SIBs, for example SIB1, SIB2 and SIB14 according to present configurations of the LTE standard. This type of size optimized SIB (SIB-M) can be used in both normal operation of the MTC devices and also may be used in enhanced coverage situations. In enhanced coverage situations, potential modifications to the LTE standard could use the receipt of plural SIBs in order to achieve the desired gain in the signal, thereby providing the required information to the MTC device in situations where coverage, namely signal reception, can be limited.

In addition, for further enhancement, this single optimized SIB (SIB-M) can be transmitted on a fixed schedule. As such, using a single optimized SIB (SIB-M) with a fixed schedule of transmission can help with power saving, as the UE can limit the necessary decoding of the SIB-M to the specific schedule, while further only requiring a smaller amount of decoding due to the optimized, limited size of the SIB itself, when compared to the plural SIBs that would need to be decoded to obtain at least the system information provided in the SIB-M. It is considered that a required data size of the SIB-M will be about 200-300 bits of information which will provide the UE with the necessary information for access to the LTE communication system. For a normally operating UE, the pieces of the information provided within the SIB-M would typically be present within the contents of SIB1 and SIB2. As is known SIB1 contains information relating to cell access related information and SIB2 contains information relating to radio resource configuration information. Additionally, the SIB-M includes some information that would typically be contained within SIB14 which relates to extended access barring (EAB) information as it relates to MTC devices.

It is also considered that SIB-M can be transmitted on a less frequent schedule and with restrictions relating to how often it is updated. However, a potential problem with the scheduling modification of this sort relates to legacy SIBs, wherein for commonly applicable information that is also in the SIB-M this information could only be changed when it can also be changed in the SIB-M. This requirement could be required in order to align the standard SIBs with the newly implemented SIB-M. In some instances, the SIB-M can contain information that is exclusively for MTC UEs. However, information contained in legacy SIBs can be modified in a more frequent time frame from that assigned to the SIB-M, provided that that particular information being modified does not form a portion of the content of the SIB-M.

It will be appreciated that transmitting the SIB-M introduces some redundancy to the overall LTE system capacity because it takes away some resources for transmission thereof which could be used for other purposes. However, this additional overhead can at least in part be mitigated by transmitting SIB-M less frequently than legacy SIBs, due at least in part to the higher tolerance that MTC devices have to latency.

The SIB-M can further be transmitted in a known position, within a radio frame, to avoid the need to first decode the Physical Downlink Control Channel Downlink Control Information (PDCCH/DCI) in order to know the location of the SIB-M. This specified location of SIB-M can reduce network resources used and decrease time for decoding. Furthermore, SIB-M can be transmitted in varying frequencies (eg. frequency hopping) in order to achieve a benefit relating to frequency diversity. However, acquisition of a frequency hopping pattern, which would be used for this transmission of the SIB-M would need be provided to the UE in advance. For example, an indication of the pattern location can be provided in the MIB. It would be understood, that without this transmission of information relating to the frequency hopping pattern and pattern location, an initial acquisition the SIB could be difficult to achieve and could consume significant time and power of the MTC UE. It is noted that this frequency hopping transmission of the SIB-M can be especially difficult in coverage enhancement mode, wherein plural SIB-Ms are collected for a desired gain in the signal.

However, time diversity can be an acceptable alternative to frequency diversity, because of the typical delay tolerance of MTC devices. For example, multiple versions of the SIB-M can be transmitted at different time instants. Alternatively, a redundant forward error correction code can be added and the SIB-M can be spread in time by means of bit-interleaving before it is transmitted.

In some instances, the SIB-M can be transmitted with a variable modulation and coding scheme. However, using a fixed, robust modulation and coding scheme would essentially avoid the need for an indication of the variable modulation and coding rate to be transmitted to the UEs, for example in the MIB. If no such indication was provided, the UEs would need to perform blind decoding of various possible options relating to the modulation and coding scheme of the SIB-M. However, defining a robust modulation and coding scheme (MCS) would typically require more physical resources to be allocated within the LTE system. A more robust MCS would require fewer repetitions of SIB-M to be received by the UE when coverage enhancement is required. In light of the fact that typically MTC UEs have a tolerance to latency, the latency requirement for SIB-M can be significantly lower than that for the transmission of the MIB. Accordingly, a less powerful modulation and coding scheme could be selected, likely resulting in more repetitions of the SIB-M being required to be sent and thus received by the MTC UE for coverage enhancement. As such, while there would likely be more delay for reception, the use of a less powerful modulation and coding scheme could enable a better use of physical resources of the LTE system.

In some instances, the SIB-M can be constrained such that changes to the content thereof occurs relatively infrequently since any time that SIB-M changes the MTC UE would be required to restart its accumulation of multiple copies, in particular if the MTC UE is in coverage enhancement.

In some instances, SIB-M can be positioned at a fixed position in a respective radio frame and with a fixed MCS, which can help with the conservation of power by the UE, however there remain techniques which can provide further improvement in MTC UE power usage. For example, it is estimated that a MTC UE in bad coverage, sending 100 bits every 15 minutes, with long connected mode DRX (wherein a DRX cycle comprises an "on duration" during which the MTC UE monitors the PDCCH and a "DRX period" during which the MTC UE can skip reception of downlink channels for battery saving purposes), may require up to 50% of its power capacity solely for reading the MIB and SIB being transmitted by the eNB.

According to embodiments of the present invention, in order to reduce the power consumption of the MTC UE during a period of checking if the SIB therefor has changed during the period of inactivity, for example upon the MTC UE entering a wake up period, the SIBs previously received by the MTC UE can be correlated with newly received SIBs in order to determine if changes have occurred. For example, should a newly received SIB be the same, a high correlation will be determined, thus resulting in the MTC UE not having to decode the newly received SIB as the previously received SIB is the same. This correlation action can save power at the MTC UE because the MTC UE does not have to decode the SIB if it can quickly determine that the contents have not changed.

It is understood that this correlation technique being applied to the SIB, can be applied to the specific SIBs which are required for the operation of the respective UE. For example, for a MTC UE, SIB1 and SIB2 are typically required for connectivity with the eNB. In some instances SIB14 may be required. Furthermore, should SIB-M be employed for the provision of system information for the connection of the MTC UE with the eNB, this correlation technique can be applied to the SIB-M.

According to some embodiments, the correlation between the previously received SIB and the newly received SIB may need to be assessed across multiple copies of the SIB in order to achieve the desired coverage gain. In some embodiments, a restriction can be applied to the SIB content from changing frequently. This type of restriction can provide a greater possibility that the SIB has not changed thereby providing a decrease in the level of power consumption, due to the reduced amount of computation the MTC UE is required to perform.

For example, in a case where a strong correlation between the currently received and previously received SIB occurs, the MTC UE will know that the SIB has not changed. However, if this correlation between the currently received and previously received SIBs is weak, this indicates that the SIB has changed and the MTC UE will be required to perform a full SIB decode to obtain the updated system information.

The determination of the correlation between the previously received SIB and the currently received SIB can be determined in a variety of ways as would be known to a worker skilled in the art. In some embodiments, a correlation coefficient can be determined, wherein for example this coefficient can range between 1 and −1, wherein a correlation coefficient of 1 to 0.7 can be considered a strong similarity correlation. The specific parameters for the determination of the level of correlation can be determined based on a desired set of criteria, given the amount of data being correlated, which is dependent on the SIB being evaluated, for example SIB1, SIB2, SIB14, SIB-M or the like.

As is known, SIB1 has a change count that indicates its version so that a UE may determine if it has been updated from the change count. In some embodiments of the present invention, a SIB which is configured for a MTC UE, for example a SIB-M, can also include a change count. This type of configuration may provide the MTC UE with an initial piece of information which may signify that the SIB has indeed changed.

However, in some instances, the correlation properties of the SIB versions may not be suitable for the determination of changes of the SIB, for example two SIBs with different information may correlate with a certain degree of strength, which may reach an assigned threshold. Alternatively, correlation properties of SIB versions may result in a desired level of correlation not being obtained, while the SIBs are in fact the same. This type of false positive could result in the MTC UE unnecessarily obtaining and decoding the SIB, when it is not necessary thus resulting in unnecessary power consumption thereby.

According to embodiments of the present invention, one or more correlation enhancement bits are used for enabling a higher degree of confidence in a determined correlation level. For example for a correlation level which defines that the SIB has not changed, modifications of the SIB or information transmitted proximate thereto can be defined such that this correlation is enhanced.

In some embodiments, a SIB can have positioned adjacent to it one or more correlation bits in the form of a Pseudo Noise sequence (PN sequence) or a Zadoff-Chu sequence, wherein this sequence changes when the information content of the SIB changes. As is known these types of sequences have good correlation properties, and thus can provide for a further enhancement of the correlation determination of the SIB, for example if the same SIB would not otherwise result in a strong correlation therebetween. As would be readily understood, other sequences may be used for this purpose, provided that the sequence selected has desired good correlation properties and has a bit sequence that contains a number of bits which is not greater than a specific threshold, for example a particular fraction of the SIB itself, thereby still enabling a desired level of reduced power consumption by the UE. The inclusion of the above noted sequence can even improve the reliability of the strength of the correlation determination even when considered after the addition of the cyclic redundancy check (CRC) and convolutional encoding to the SIB. In some embodiments, a UE that has received the SIB can then check for changes therein relative to a previously received SIB, by correlating just the adjacent sequence (and optionally the sequence and the SIB) to see if it continues to match, which would be defined by a strong correlation therebetween. For example, if the SIBs do not match, namely have a weak correlation, then the MTC UE can proceed with full reception of the body of the SIB if that had not been received already and subsequently proceed with the decoding thereof.

Figure 1:
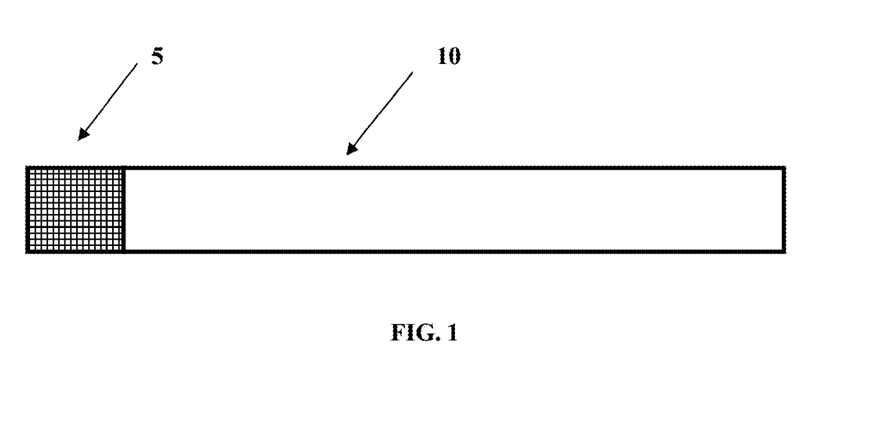
FIG. 1 illustrates a System Information Block comprising a sequence positioned adjacent thereto in accordance with embodiments of the present invention.

FIG. 1 illustrates a System Information Block comprising a sequence positioned adjacent thereto in accordance with embodiments of the present invention. In this example, the sequence 5 is positioned proximate to the beginning of the System Information Block 10. However, in some embodiments, the sequence may be positioned proximate to the end of the SIB.

According to embodiments, for example when only the sequence adjacent to the SIB is being correlated, the UE does not need to receive and correlate all of the SIB every time it is sent. As such, the UE may go into a low power state once it has received and correlated the adjacent sequence, provided for example that the correlation is strong indicating no changes to the SIB have occurred. The adjacent sequence would provide a level of assurance that even if the UE had not been aware of more than one change of the SIB it would quickly detect a difference and re-acquire the updated SIB.

According to embodiments, it may be considered that there are a limited number of sequences which may be available for positioning adjacent the SIB, thus requiring periodic re-use of these sequences. According to embodiments, a minimum interval to re-use a sequence for adjacent placement with a SIB may be defined and the UE may be required to re-acquire the SIB after this amount of time, thereby ensuring that there is not an incorrect correlation determination by use of the same adjacent sequence, when in fact the SIB had changed. It is understood that restricting the frequency of SIB changes and a time period after which a refresh is always required is defined in the current LTE standard for SIB reception.

In some embodiments, another means for enhancing the correlation determination of the SIBs, can be provided wherein the SIB itself may be configured to include small fields of one or more correlation enhancement bits in the form of "don't care" bits or a single "don't care" bit which are spread throughout the SIB. These bits would not have any meaning to the UE and would be set by the eNB to obtain good correlation properties from the last N sets of SIBs. For example, the "don't care" bits can be calculated and changed by the eNB to make the correlation lower so that a UE using correlation to check for changes of the SIB would have a better indication of a change in the SIB, namely the correlation would result in a low correlation coefficient indicating that the SIB has changed.

Figure 2:
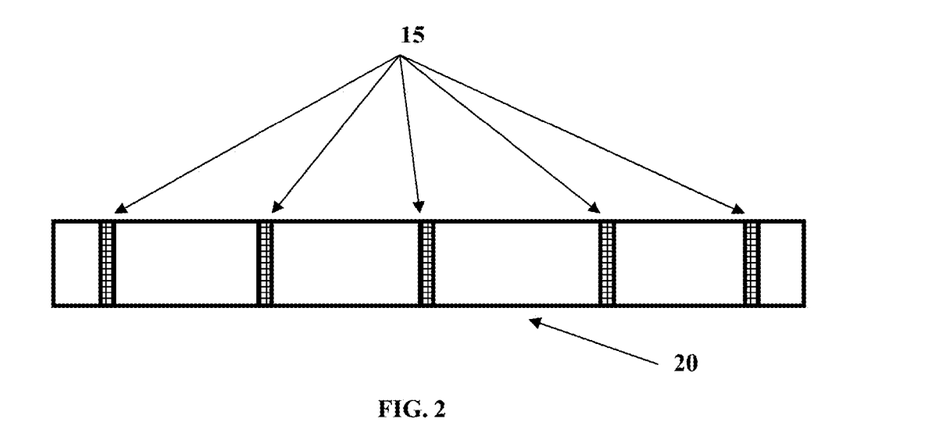
FIG. 2 illustrates a System Information Block comprising "don't care" bits positioned therein in accordance with embodiments of the present invention.

FIG. 2 illustrates a System Information Block comprising "don't care" bits positioned therein in accordance with embodiments of the present invention. In this example, the "don't care" bits 15 are spaced substantially evenly throughout the SIB 20. In some embodiments, the "don't care" bits are positioned at a varying locations, however the location of these "don't care" bits has to be known to the UE in order that the UE can identify which bits within the SIB are the "don't care" bits.

In some embodiments, when generating a new SIB version, the eNB can compare several previous SIBs with the new SIB. Plural versions of this new SIB can be assembled with different combinations of "don't care" bits to assure the lowest possible correlation. For example, the new SIB has a first pattern of "don't care" bits therein and the previous SIB has a second pattern of "don't care" bits therein, such that the first pattern and the second patter provide a low correlation. This provision for the generation of the new SIB can provide a greater level of assurance that even if a UE had not been awake to receive the last several changes that were made to the SIB, the newly awakened UE would still see a low correlation with the current received SIB and know that the SIB has in fact changed. In some embodiments, a SIB assembled in this manner may only require for example 5 "don't care" bits, however, it is noted that correlation of the SIB would be required over the entire SIB in one subframe.

In some embodiments, the at least one correlation enhancement bit is one or more bits that are present in the SIB, for example the change count associated with a SIB. The change count associated with a current SIB can be modified in order to adjust the level of correlation between the current SIB and a previously transmitted SIB. Using one or more bits already associated with the SIB can reduce the overhead for the transmission of the SIB which includes one or more correlation enhancement bits, when compared to a SIB with integrated "don't care" bits or a SIB having a sequence positioned adjacent thereto.

In some embodiments, the change count associated with a SIB can be assigned in a random manner. In some embodiments, the change count associated with a SIB can be assigned a bit sequence that can specifically enhance correlation between a first SIB and a second SIB, thereby enabling identification of a changed SIB. In some embodiments, the sequence can be a Pseudo Noise sequence (PN sequence) or a Zadoff-Chu sequence, or similar sequence with a desired level of correlation as would be readily understood by a worker skilled in the art.

Figure 3:
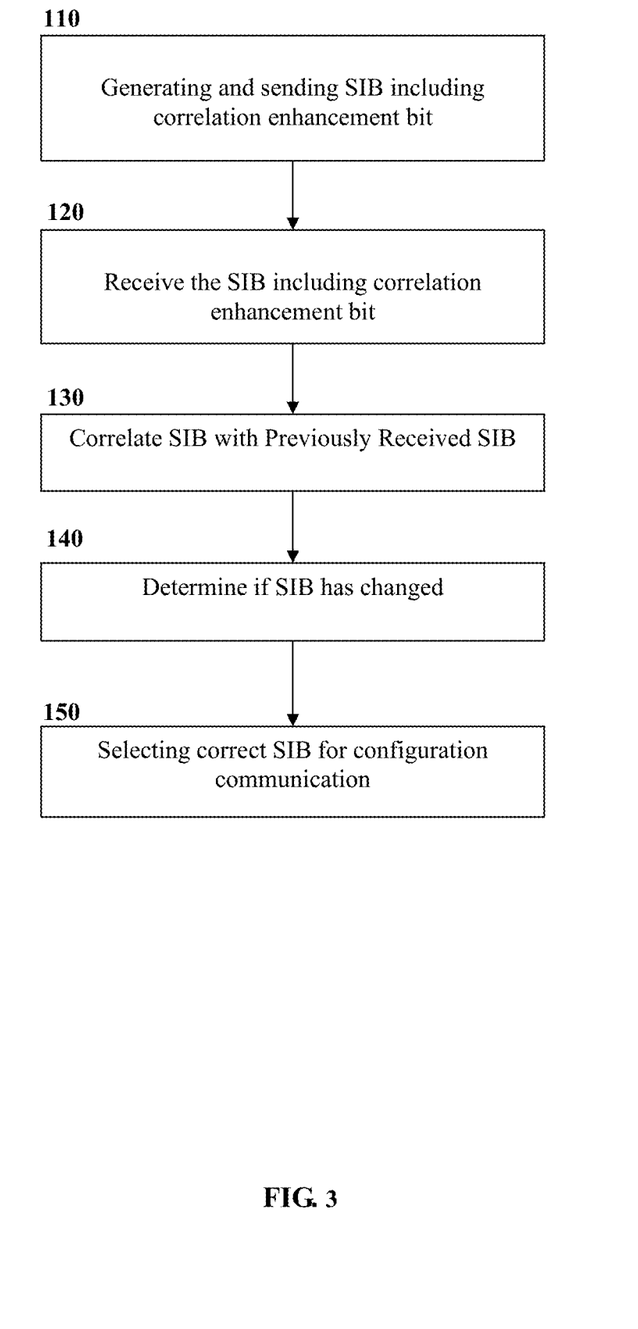
FIG. 3 illustrates a method for communicating system information from a base station to a User Equipment provided in accordance with embodiments of the present invention.

FIG. 3 illustrates a method for communicating system information from a base station, for example an eNB to a terminal for example a User Equipment (UE) provided in accordance with embodiments of the present invention. The method includes generating and sending 110 by the base station, a system information block (SIB) which includes at least one correlation enhancement bit. The user equipment subsequently receives the SIB 120 and upon receipt of the SIB the UE correlates 130 the SIB with a previously received SIB. The result of this correlation provides the UE with a determination 140 as to whether the SIB has changed relative to the previously received SIB. The UE subsequently selects 150 a correct SIB for configuring communication with the base station, wherein this selection is based on the result of the determination which is based on the correlation.

According to embodiments, a desired correlation false detection target can be set to achieve about $10^{-4}$ or better. In addition, correlation thresholds can be set as a percentage of energy or a set threshold number. In some embodiments, for improved accuracy the correlation can be normalized relative to the previous signal level. Furthermore, correlation can be compared with known SIB changes and the threshold can be adjusted to be a defined amount better (for example percentage better) in order for a match between the previously received SIB and the currently received SIB to be declared.

It is known that based on the LTE standard, the information relating to the primary synchronization signals (PSS) and secondary synchronization signals (SSS) is repeated in each 10 ms frame in Subframes 0 and 5. MIB information is located in Subframe 0 and SIB1 information (or legacy SIB1 information which is defined by previous releases of the LTE standard) is in alternate frames and positioned in Subframe 5. According to the LTE standard, the UE must receive PSS, SSS and MIB information that is repeated regularly in the center 1.4 MHz of all possible system bandwidths before decoding the SIB-1. SIB-1 then indicates the locations of the other SIBs. This sequential decoding of the information for access to the eNB can take more power from the UE than if both MIB and SIB could be received by the UE in parallel.

Figure 4:
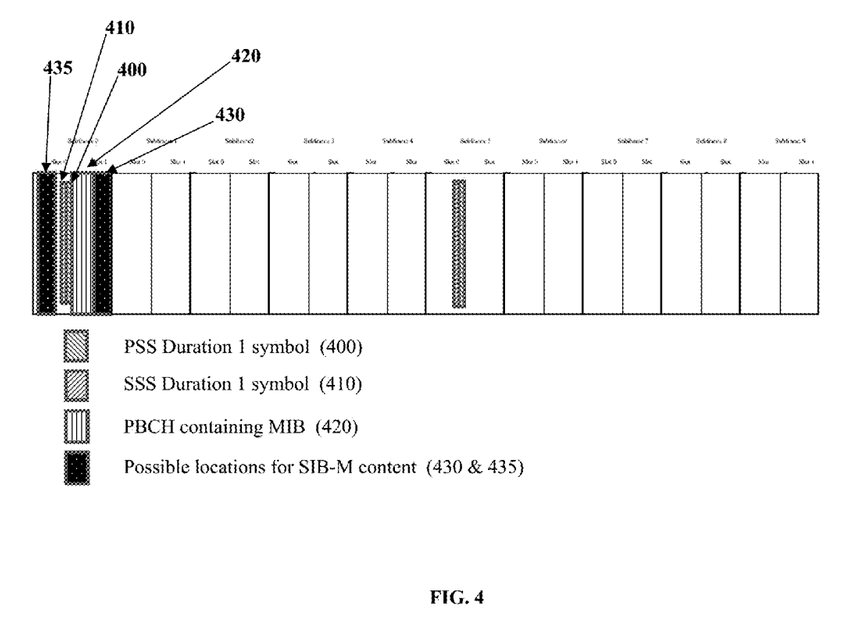
FIG. 4 illustrates positioning of information within a radio frame, in accordance with embodiments of the present invention.

For example, with reference to FIG. 4, a 10 ms radio frame is illustrated, which contains 10 Subframes, which is one of a sequence of 1024, wherein each slot contains 7 symbol intervals. In this figure the vertical dimension is 6 Physical Resource Blocks each containing 12 OFDM frequencies. The total in this example is 72 frequencies over 1.4 MHz. FIG. 4 defines locations within the radio frame of PSS 400 having a duration of 1 symbol, SSS 410 having a duration of 1 symbol, the PBCH which contains the MIB 420. In addition, this figure illustrates possible locations for the SIB-M content to be placed 430 and 435.

According to embodiments of the present invention, to allow longer sleep times during the SIB/MIB parallel decoding, the SIB-M, which is assigned to LC MTC UE can be allocated resources adjacent to the MIB in Subframe 0. This positioning can allow the UE to receive the MIB and then the SIB before going back into a low power state until the next MIB decode (for example, 10 ms later). However, if the UE is located in a bad coverage area, namely a location of poor reception, the UE can do multi-SF (space-frequency) channel estimation which may prevent the UE from sleeping as desired for power conservation.

According to some embodiments, an alternative option would be for the UE to "wake-up" at another time to receive the SIB-M. However, this alternative option may not allow as much sleep time for the UE.

In some embodiments, if SIBs are repeated less frequently than 10 ms, as can be performed in order to economize on the use of network resources, the UE may have to make additional blind decoding trials since the UE will not have a way to know if there is a SIB in the expected 10 ms allocation or not. This scenario may require the UE to use more power in order to successfully decode the SIB.

In some embodiments, in order to reduce power consumption by the UE, the eNB can send SIBs more often to allow for quick accumulation (for example send a SIB every 10 ms for best coverage). This transmission of the SIBs can avoid the UE doing decodes when the SIB is not sent at that location in the frame. In addition, according to embodiments, the coding rate can be fixed or limited to avoid blind decoding being required by the UE. Furthermore, according to some embodiments, the choice of coding depends on the coverage and SIB decoding time required. For example, a minimally encoded SIB (for example a 256 bit SIB can fit in 3 physical resource blocks (PRBs) (Transport Block Size Index ($I_{TBS}$)=6 QPSK quadrature phase shift keying)) will use less resources but will take the UE more copies to accumulate sufficient gain in the signal and also use more power, when compared to a higher coded SIB which may use too many system resources (e.g., a 6 PRB SIB every 10 ms which requires 10% of the resources in a 1.4 MHz system).

As is known, the MIB contains only a small amount of information but it needs to be quickly and clearly received by all legacy UEs. In contrast, a SIB-M does not necessarily need to be coded so robustly as a MIB despite having around 200-300 bits of content. This reduced robustness of coding can be performed because the MTC UEs are delay tolerant and can, if necessary for coverage enhancement, receive multiple copies of the SIB-M. In addition, a SIB-M may not need to occupy resources across the entire 1.4 MHz frequency. For example, the transmission of a SIB-M can be regularly scheduled on a specific set of PRBs. Furthermore, repetitive reception of the SIB-M could be facilitated by using the same frame times relative to the PSS/SSS and Physical Broadcast Channel (PBCH) for the MIB. In some embodiments, in a case where the amount of time allowed for SIB acquisition by UEs is less critical, the interval between SIB-M transmissions could optionally be extended. For example, taking a minimum interval of 10 ms, additional multiples of 10 ms could be added between SIB-M repetitions. The SIB-M could then be repeated only every 20 ms or 40 ms. Longer intervals would allow for more efficient use of the downlink channel (PDCCH or PDSCH) at the expense of slower acquisition of the SIB-M by the UEs. In addition, as a UE would not know what the repetition rate of the SIB-M would be, the UE would need to attempt to blind decode the data from the known positions at the minimum interval of every 10 ms and this process would require several blind decoding "buckets". For example, there would be one blind decoding "bucket" for every 10 ms, two blind decoding "buckets" for the 2× interleaved possibilities every 20 ms and four blind decoding "buckets" for the 4× possible positions every 40 ms. This configuration results in a total of seven blind decoding "buckets" being required. It is understood that longer intervals require more power because the UE still needs to decode every 10 ms. Furthermore, for longer intervals, more memory is needed in order to hold the coherent combinations, namely the blind decoding "bucket" information. For example if instead 10, 20 and 40 ms intervals, 40, 80, and 160 ms intervals were used, 4+8+16=28 coherent memory buckets for blind decoding would be required.

An alternative would be that if longer intervals between SIB-M copies were to be used but mitigation of the above noted decoding time was required, a more robust coding of the SIB-M would be required which in turn would result in more resources being required for receiving and decoding and accordingly more power consumption by the UE.

In some embodiments, if a UE knew the system frame number (SFN) of the transmissions of the SIB-M, the UE would likely not require the additional blind decodes. The SFN is provided to the UE within the MIB, so decoding the MIB provides the UE with the information regarding the SFN count.

In some instances, extended sleep times are desired for LC MTC UEs. For example, longer DRX times, e.g. a wake-up of the UE every 15 minutes, may be allowed and this extended DRX time can provide for significant UE power savings. In some embodiments, if UEs operating in this extended DRX mode also require coverage enhancement, having all such UEs associated with a particular eNB synchronized to wake up at the same time may provide an operational advantage. For example, once the assigned wake up time is established, excess PSS and SSS messages (for example, 2 times or 4 times the normal number of PSS and SSS messages) can be sent during the scheduled wake-up interval. In addition, in some embodiments, all communications could be grouped to these UEs whilst excluding other devices serviced by the eNB which do not require the plural transmission of the PSS and SSS. In some embodiments, multiple interleaved instances of these plural transmissions can be scheduled according to traffic requirements of the network.

Figure 5:
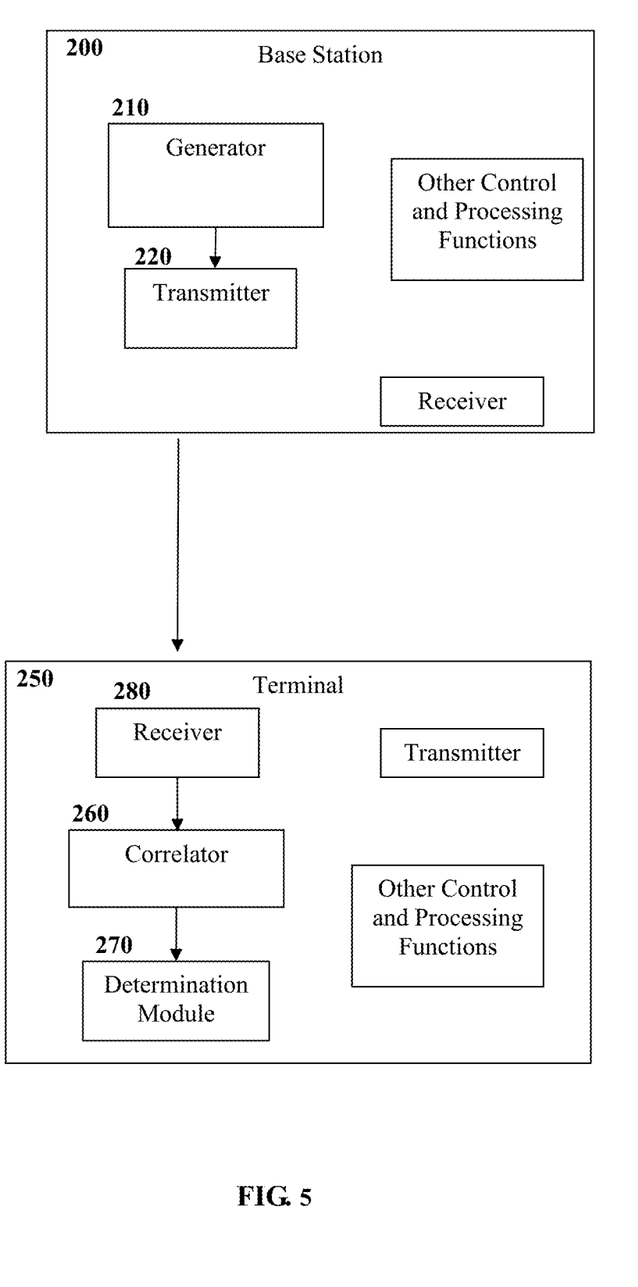
FIG. 5 illustrates operations of an eNB or base station and a terminal or User Equipment (UE), in accordance with embodiments of the present invention.

With reference to FIG. 5, another aspect of the present technology provides a wireless communication system comprising a base station 200 and a wireless terminal 250. Although only a single wireless terminal 250 is shown, typically the system will comprise a plurality of such wireless terminals associated with each base station. The system is configured in part for wirelessly communicating system information, such as SIBs, from the base station to the terminal. The base station is configured in particular to broadcast the system information in accordance with a predetermined standard, such as LTE. As will be readily understood, the various modules of the base station and terminal may be implemented using existing hardware, such as microprocessors, signal processors, or the like. The existing hardware may be adapted to carry out the functions as described herein via specially provided software or firmware, for example.

The above-mentioned wireless communication system comprises a base station having a generator 210 and a transmitter 220. The base station otherwise includes the necessary components of a standard base station, such as an eNB in LTE. The generator is configured to generate a system information block (SIB) including at least one correlation enhancement bit. The transmitter is configured to transmit the system information block (SIB) including at least one correlation enhancement bit to the wireless terminal.

The wireless terminal of the above-mentioned system comprises a receiver 280 and a correlator 260. The wireless terminal further includes a determination module 270. The wireless terminal otherwise includes the necessary components of a standard wireless terminal, such as a mobile or non-mobile UE or machine-to-machine terminal of an LTE network. The receiver 280 is configured to receive a system information block (SIB) including at least one correlation enhancement bit. The correlator 260 is configured to correlate the SIB with a previously received SIB. The determination module is configured to determine if the SIB has changed based on the correlation and select a correct SIB for configuring communication with the base station based on the determination. The receiver 280 and/or the correlator 260 may be configured to participate in blind decoding of the received data when required.

It will be appreciated that, although specific embodiments of the technology have been described herein for purposes of illustration, various modifications may be made without departing from the spirit and scope of the technology. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each step of the method may be executed on any computing device, such as a personal computer, mobile or handheld wireless device, M2M device, PDA, or the like and pursuant to one or more, or a part of one or more, program elements, modules or objects generated from any programming language, such as C++, Java, PL/1, or the like. In addition, each step, or a file or object or the like implementing each said step, may be executed by special purpose hardware or a circuit module designed for that purpose.

It is obvious that the foregoing embodiments of the technology are examples and can be varied in many ways. Such present or future variations are not to be regarded as a departure from the spirit and scope of the technology, and all such modifications as would be obvious to one skilled in the art are intended to be included within the scope of the following claims.

We claim:

1. A method for communicating system information from a base station to a user equipment (UE) in a wireless network, the method comprising:
generating and sending by the base station, a system information block (SIB) and at least one correlation enhancement bit associated with the SIB;
receiving, by the UE, the SIB;
correlating, by the UE, the SIB with a previously received SIB, wherein correlating the SIB with the previous SIB comprises correlating without decoding over the at least one correlation enhancement bit and at least one previous corresponding correlation enhancement bit of the previously received SIB, and wherein the at least one correlation enhancement bit is configured to produce a low correlation value of said correlating without decoding when content of the SIB differs from content of the previously received SIB, and wherein the at least one correlation enhancement bit is configured to produce a high correlation value of said correlating without decoding when content of the SIB matches content of the previously received SIB;
determining, by the UE, if the SIB has changed based on the correlation; and
selecting, by the UE, a correct SIB for configuring communication with the base station based on the determination.

2. The method according to claim 1, wherein the at least one correlation enhancement bit is indicated using a sequence positioned adjacent to the SIB.

3. The method according to claim 2, wherein the sequence is a Pseudo Noise sequence or a Zadoff-Chu sequence.

4. The method according to claim 2, wherein the sequence comprises a first number of bits and the SIB comprises a second number of bits, wherein the first number of bits is a fraction of the second number of bits.

5. The method according to claim 1, wherein the at least one correlation enhancement bit includes one or more don't care bits positioned within the SIB.

6. The method according to claim 1, wherein the at least one correlation enhancement bit includes plural don't care bits spread throughout the SIB.

7. The method according to claim 6, wherein the plural don't care bits are spread evenly throughout the SIB.

8. The method according to claim 1, wherein the at least one correlation enhancement bit is also used as a change count associated with the SIB.

9. The method according to claim 8, wherein the at least one correlation enhancement bit is assigned randomly.

10. The method according to claim 8, wherein the at least one correlation enhancement bit is a Pseudo Noise sequence or a Zadoff-Chu sequence.

11. The method according to claim 1, wherein the at least one correlation enhancement bit is included in the SIB.

12. The method according to claim 1, further comprising decoding the SIB when the SIB is selected as the correct SIB.

13. A method for communicating system information from a base station to a user equipment (UE) in a wireless network, the method comprising:
generating and sending by the base station, a system information block (SIB) including at least one correlation enhancement bit;
receiving, by the UE, the SIB;
correlating, by the UE, the SIB with a previously received SIB;
determining, by the UE, if the SIB has changed based on the correlation; and
selecting, by the UE, a correct SIB for configuring communication with the base station based on the determination,
wherein the previously received SIB includes a first plurality of don't care bits spread throughout the previously received SIB in a first pattern, and wherein the at least one correlation enhancement bit includes a second plurality of don't care bits spread throughout the SIB in a second pattern, wherein the second pattern is assembled to provide low correlation with the first pattern.

14. A base station for communicating system information to a user equipment (UE) in a wireless network, the base station comprising:
a) a generator configured to generate a system information block (SIB) and at least one correlation enhancement bit associated with the SIB; and
b) a transmitter configured to transmit the SIB including at least one correlation enhancement bit to the UE,
wherein the at least one correlation enhancement bit is configured to produce a low correlation value, when subject to a correlation operation by the UE, when content of the SIB differs from content of the previously received SIB, and wherein the at least one correlation enhancement bit is configured to produce a high correlation value, when subject to said correlation operation by the UE, when content of the SIB matches content of the previously received SIB, and
wherein said correlation operation by the UE comprises correlating without decoding over the at least one correlation enhancement bit and at least one previous corresponding correlation enhancement bit of the previously received SIB.

15. The base station according to claim 14, wherein the at least one correlation enhancement bit is conveyed using a sequence positioned adjacent to the SIB.

16. The base station according to claim 15, wherein the sequence is a Pseudo Noise sequence or a Zadoff-Chu sequence.

17. The base station according to claim 15, wherein the sequence comprises a first number of bits and the SIB comprises a second number of bits, wherein the first number of bits is a fraction of the second number of bits.

18. The base station according to claim 14, wherein the at least one correlation enhancement bit includes one or more don't care bits positioned within the SIB.

19. The base station according to claim 14, wherein the at least one correlation enhancement bit includes plural don't care bits spread throughout the SIB.

20. The base station according to claim 19, wherein the plural don't care bits are spread evenly throughout the SIB.

21. The base station according to claim 14, wherein the at least one correlation enhancement bit is also used as a change count associated with the SIB.

22. The base station according to claim 21, wherein the at least one correlation enhancement bit is assigned randomly.

23. The base station according to claim 21, wherein the at least one correlation enhancement bit is a Pseudo Noise sequence or a Zadoff-Chu sequence.

24. A base station for communicating system information to a user equipment (UE) in a wireless network, the base station comprising:
a) a generator configured to generate a system information block (SIB) including at least one correlation enhancement bit; and
b) a transmitter configured to transmit the SIB including at least one correlation enhancement bit to the UE,
wherein a previously transmitted SIB includes a first plurality of don't care bits spread throughout the previously transmitted SIB in a first pattern, and wherein the at least one correlation enhancement bit includes a second plurality of don't care bits spread throughout the SIB in a second pattern, wherein the second pattern is assembled to provide low correlation with the first pattern.

25. A wireless terminal for receiving system information from a base station in a wireless network, the wireless terminal comprising:
a) a reception module configured to receive a system information block (SIB) and at least one correlation enhancement bit associated with the SIB; and
b) a correlating module configured to correlate the SIB with a previously received SIB, wherein correlating the SIB with the previous SIB comprises correlating without decoding over the at least one correlation enhancement bit and at least one previous corresponding correlation enhancement bit of the previously received SIB, and wherein the at least one correlation enhancement bit is configured to produce a low correlation value of said correlating without decoding when content of the SIB differs from content of the previously received SIB, and wherein the at least one correlation enhancement bit is configured to produce a high correlation value of said correlating without decoding when content of the SIB matches content of the previously received SIB; and
c) a determination module configured to determine if the SIB has changed based on the correlation and select a correct SIB for configuring communication with the base station based on the determination.

26. A computer program product comprising a non-transitory computer readable medium storing computer executable statements and instructions thereon that, when executed by a computer, perform operations for implementing the method for communicating system information from a base station to a user equipment (UE) in a wireless network, the method comprising the steps of:
receiving, by the UE, the System Information Block (SIB) and at least one correlation enhancement bit associated with the SIB;
correlating, by the UE, the SIB with a previously received SIB, wherein correlating the SIB with the previous SIB comprises correlating without decoding over the at least one correlation enhancement bit and at least one previous corresponding correlation enhancement bit of the previously received SIB, and wherein the at least one correlation enhancement bit is configured to produce a low correlation value of said correlating without decoding when content of the SIB differs from content of the previously received SIB, and wherein the at least one correlation enhancement bit is configured to produce a high correlation value of said correlating without decoding when content of the SIB matches content of the previously received SIB;

determining, by the UE, if the SIB has changed based on the correlation; and selecting, by the UE, a correct SIB for configuring communication with the base station based on the determination.

\* \* \* \* \*